US006769990B2

(12) United States Patent
Cohen

(10) Patent No.: US 6,769,990 B2
(45) Date of Patent: Aug. 3, 2004

(54) NETWORKED SEARCH AND TRACKING GAMES

(76) Inventor: Robert Cohen, 623 N. Crescent Heights Blvd., Los Angeles, CA (US) 90048

( * ) Notice: Subject to any disclaimer, the term of this patent is extended or adjusted under 35 U.S.C. 154(b) by 558 days.

(21) Appl. No.: 09/745,627

(22) Filed: Dec. 21, 2000

(65) Prior Publication Data

US 2001/0024974 A1 Sep. 27, 2001

Related U.S. Application Data

(63) Continuation-in-part of application No. 09/020,034, filed on Feb. 6, 1998, now Pat. No. 6,074,299, which is a continuation of application No. 09/550,042, filed on Apr. 14, 2000, now abandoned.

(51) Int. Cl.⁷ .............................................. A63F 13/00
(52) U.S. Cl. ............................................ 463/42; 463/9
(58) Field of Search ............................. 463/9, 23, 25, 463/42; 434/322, 350, 323; 705/14; 700/91–93

(56) References Cited

U.S. PATENT DOCUMENTS

| | | | |
|---|---|---|---|
| 5,035,625 A | | 7/1991 | Munson et al. ............. 434/332 |
| 5,083,800 A | | 1/1992 | Lockton ..................... 273/439 |
| 5,241,671 A | | 8/1993 | Reed et al. ................. 395/600 |
| 5,586,937 A | | 12/1996 | Menashe ..................... 463/41 |
| 5,643,088 A | | 7/1997 | Vaughn et al. ............... 463/40 |
| 5,679,075 A | * | 10/1997 | Forrest et al. ................ 463/9 |
| 5,712,979 A | | 1/1998 | Graber et al. ............... 709/224 |
| 6,061,660 A | * | 5/2000 | Eggleston et al. ............ 705/14 |
| 6,074,299 A | | 6/2000 | Cohen .......................... 463/42 |
| 6,102,406 A | * | 8/2000 | Miles et al. ................ 273/430 |
| 6,224,486 B1 | * | 5/2001 | Walker et al. ................ 463/42 |
| 6,267,675 B1 | * | 7/2001 | Lee ............................. 463/40 |
| 6,312,337 B1 | * | 11/2001 | Edwards et al. .............. 463/42 |
| 6,606,745 B2 | * | 8/2003 | Maggio ....................... 725/23 |

OTHER PUBLICATIONS

C. Perrone et al: WebQuest: Substantiating education in edutainment through interactive learning games; May 1, 1996, pp. 1307–1319, vol. 28, No. 11, Computer Networks and ISDN Systems.

D. Julien: Adventure Games as a Continuing Education Exercise, Library Software Review, Jan.–Feb. 1986, pp. 16–20, vol. 5, No. 1.

M.A. Hornberger: Alive and Clicking: Teaching Web Research Classes, Jun. 7–12, 1997, pp. 259–261, Washington, DC, Special Libr. Assoc.

Multi channel news v17 p26, Viewer's Choice Uses Web Site, Feb. 1996.

Kim Cleland, what's on the web and read all over?, Advertising agency v. 66 p. 16 (Jun. 1995).

* cited by examiner

*Primary Examiner*—John M. Hotaling, II
(74) *Attorney, Agent, or Firm*—Christie, Parker & Hale, LLP

(57) ABSTRACT

An Internet-based Web Search Contest. Participants are provided clues as to target Web sites. The target Web sites are maintained in an ordered list and participants sequentially locate the target Web sites and are provided clues as to the next target Web site in the list guided by a character voice. Answers to the provided clues are awarded points and that are stored in a bucket associated with individual participants.

15 Claims, 8 Drawing Sheets

FIG.5

Form fields:
- FIRST NAME: (40a, 44)
- LAST NAME: (40b, 46)
- USER ID: (48)
- PASSWORD:
- E-MAIL: (49)
- PHONE:

[SIGN UP NOW!] (42)

NETWORKED SEARCH AND TRACKING GAMES

CROSS-REFERENCE TO RELATED APPLICATIONS

This is a continuation in part of pending U.S. application Ser. No. 09/020,034, filed Feb. 6, 1998, now U.S. Pat. No. 6,074,299, and a continuation of U.S. application Ser. No. 09/550,042, filed Apr. 14, 2000, now abandon, the disclosures of which are incorporated by reference as if set forth herein in full.

BACKGROUND OF THE INVENTION

This invention relates generally to tracking user computer activity and more specifically to tracking user activity on the World Wide Web (Web) of the Internet.

The Web has blossomed as communication medium. The Web is an open system in that virtually any individual or organization with a computer connected to a telephone line may use the Web to present information concerning almost any subject. The Web has a body of software, a set of protocols, and a set of defined conventions for presenting and providing information over the Web. The Web uses hypertext and multimedia techniques to allow users to gain access to information available in the Web.

Users typically operate personal computers (PC's) executing browser software to access information stored by an information provider computer. The user's computer is commonly referred to as a client, and the information provider computer is commonly referred to as a Web server. The browser software executing on the user's computer requests information from Web servers using a defined protocol. One protocol by which the browser software specifies information for retrieval and display from a Web server is known as Hypertext Transfer Protocol (HTTP). HTTP is used by the Web server and the browser software executing on the user's computer to communicate over the Internet.

Web servers often operate using the UNIX operating system, or some variant of the UNIX operating system. Web servers transmit information requested by the browser software to the user's computer. The browser software displays this information on the user's computer display in the form of a Web page. The Web page may display a variety of text and graphic materials, and may include links that provide for the display of additional Web pages. A group of Web pages provided by a common entity, and generally through a common Web server, form a Web site.

A specific location of information on the Internet is designated by a Uniform Resource Locator (URL). A URL is a string expression representing a location identifier on the Internet or on a local Transmission Control Protocol/Internet Protocol (TCP/IP) computer system. The location identifier generally specifies the location of a server on the Internet, the directory on the server where specific files containing information are found, and the names of the specific files containing information. Certain default rules apply so that the specific file names, and even the directory containing the specific files, need not be specified. Thus, if a user knows that specific information desired by the user is located at a location pointed to by a URL, the user may enter the URL on the user's computer in conjunction with execution of the browser software to obtain the desired information from a particular Web server. Users, or the browser software executing on the user's computer, must always at a minimum know the Internet address portion of the URL for a particular Web server.

Often, the user does not know the URL of a site containing desired information. Even if the user once knew the proper URL, the user may have forgotten, mistyped, or otherwise garbled a URL for a specific location, as URL's can often be lengthy strings with a variety of special characters. To allow increased ease in locating Web sites containing desired information, search engines identifying Web sites likely to contain the desired information are widely available. A search engine using a well constructed search may often very quickly allow a user to quickly and accurately locate Web sites with desired information. Due to the multiplicity of Web sites, and indeed due to the unstructured nature of the Web, a poorly constructed search may make locating a Web site with the desired information virtually impossible.

An inability of a user to quickly and easily locate a Web site poses difficulties with respect to some commercial uses of the Web. Commercial entities have found the Web a useful medium for the advertisement and sale of goods and services. A variety of commercial entities have created home pages for the commercial entity as a whole, and for particular products sold and marketed by the commercial entity. The effectiveness of advertising in such a way on the Web is dependent on users accessing a commercial entity's Web site and viewing the information located there. The user must undertake two critical actions for this to occur. The user must first access a commercial entity's Web site, and then the user must actually view the material displayed there. A user who desires to view a Web page advertising or selling a particular product, but who is a poor Web searcher, may represent a lost sale of the product. Providing such a user training in Web search techniques may well benefit both the user and the commercial entity. Other users may purchase a product if presented compelling detail about the product, but have no express desire to visit a Web site advertising and selling the product. Providing a reason for such users to visit the Web site may be of great benefit to the commercial entity selling the product.

SUMMARY OF THE INVENTION

The present invention provides a method and system of evaluating Web search capability, tracking sequential progress of Web searches, and providing an enjoyable game for increasing Web search skills. The present invention also provides a method and system of increasing Web page advertising effectiveness.

In one embodiment the invention comprises a method of tracking a user of a search contest, the user navigating between a game site and a plurality of target sites. The method includes providing clue information regarding at least one of the plurality of target sites. In one embodiment this occurs at a start time. The method also comprises connecting the user to the at least one of the plurality of target sites, the at least one of the plurality of target sites including a plurality of target locations. In one embodiment this is done at a start time, and in one embodiment connecting the user to a target site comprises providing the user a link to the target site. The method further comprises receiving answer information at an end time responsive to the clue information, and comparing the answer information to a predetermined answer key. Points are associated upon matches between the answer information and the predetermined answer key. In one embodiment the points are associated with respect to a difference between the end time and a start time.

Thus, the present invention allows users to increase their Web search capabilities, to do so in a measurable way, including measurement against the skills and capabilities of other users and provides commercial entities a way of inducing users to access their Web sites. Many of the attendant features of this invention will be more readily appreciated as this game becomes better understood by references to the following detailed description considered in connection with the accompanying drawings.

DESCRIPTION OF THE DRAWINGS

FIG. 5 is an illustration of a user registration form used in the process of the user registration resource at FIG. 3;

DETAILED DESCRIPTION OF THE INVENTION

Figure 1:
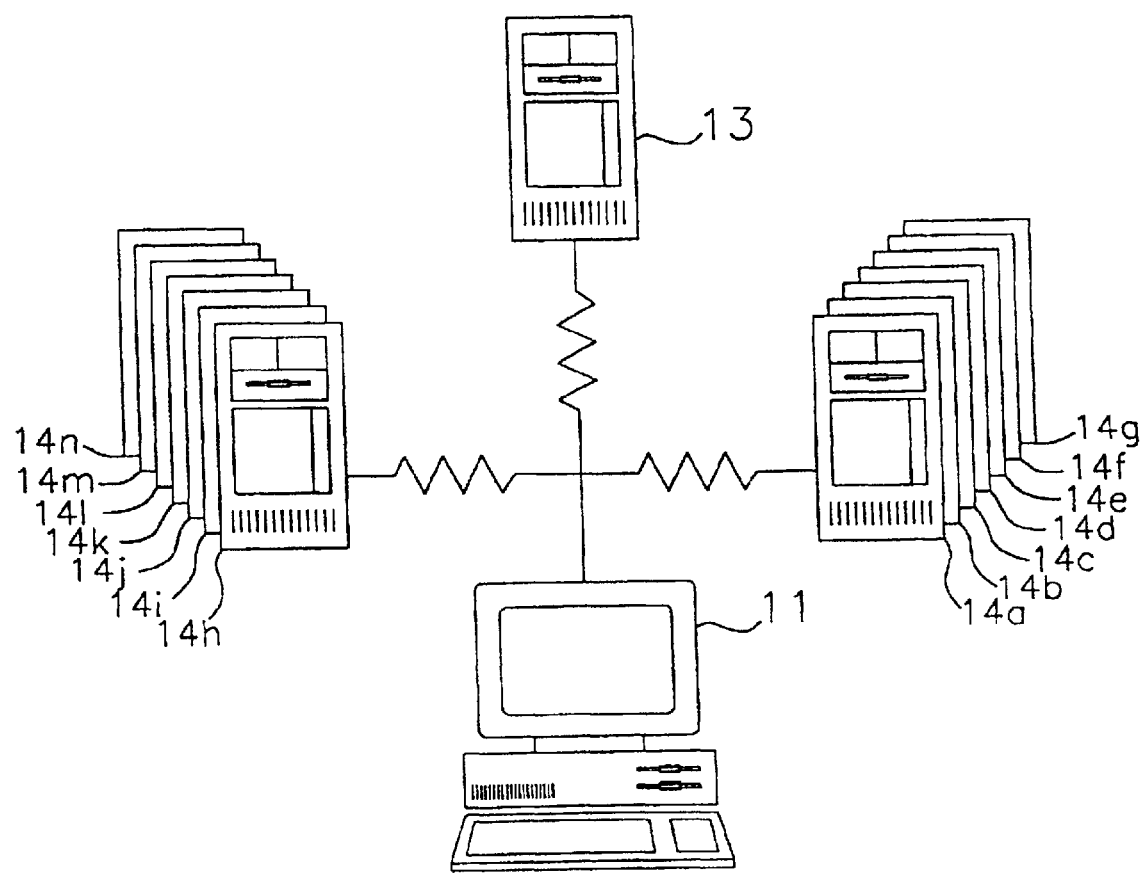
FIG. 1 is a block diagram of an internet system embodying the present invention.

An embodiment of the present invention provides an Internet-based search contest or game. Users or game participants are provided clues pertaining to Web sites or a particular Web page of a Web site by a game server. Each clue allows the game participant to locate a target, or check point, Web site or Web page. The target Web site or Web page is a target location. The game participants are provided the option of selecting a particular game where the clues and target locations contain a common interest or theme. When a game participant locates a target location, another clue pertaining to another target location is provided to the game participant. Target locations contain a special mark or logo displayed on the Web page of the target location.

Game participants indicate that they have located target sites by submitting a form on a submission page. The submission page resides on the Web server of the target location. The information input by the game participant on the submission form is provided to the game server. The game server verifies the correctness of the information input by the game participant and provides the game participant a clue pertaining to another target location. Additionally, the time spent at the target location is recorded. Points are granted based on the time spent at the target location. As game participants correctly identify target locations, the game participants are optionally provided information and/or other details by the owners of the target locations. Game participants continue to sequentially receive clues and find target locations until all target locations have been found.

Upon finding a final target location, a game participant is informed of the total time the game participant expended to find all target locations and/or the total number of points the game participant accumulated, the number of game participants who were able to find all the target locations prior to the game participant doing so, and the number of game participants who are still attempting to find target locations. Additionally, the game participant is informed of prizes that can be obtained by the game participant when the game participant redeems his or her points. A game bucket is provided to hold the points, prizes, or a combination thereof for viewing and redeeming by the game participant.

Each contest is a quest to find and view all of the target locations. Each of the game participants start at a quest home page provided by the game server to pick up clues pertaining to a target site. The game participant is guided by an electronic character to assist the game participant in progressing through the game. The game participants then find the target locations, and request information (i.e. web page data) from the target locations to view information provided by the target locations. The game participants deposit keys, i.e., code words, through use of a submission page input form to verify that they have found and viewed a target location. Game participants receive clues as to a next target location when the correct keys are deposited. Generally speaking, the keys may be any information relating to the target location. In a preferred embodiment, however, the keys include a name of the target location, the primary or targeted product sold or advertised by the target location, and a numerical value, such as the price of the primary product, displayed at the target location.

Additional clues pertaining to a target location are also obtainable by a game participant. Some game participants may be completely unable to find a target location when provided only a single clue. Other game participants may determine that a target location will take an inordinate amount of time to find given only a single clue. Accordingly, after a predetermined time after first receiving a clue pertaining to a target location, game participants are able to request additional clues pertaining to the target location so as to be able to more quickly find the target location.

FIG. 1 illustrates a block diagram of the present invention in the context of the World Wide Web. A user computer 11 is linked, telephonically or via other communication methods, to a number of other computers on the Internet. These other computers include a game server 13 and a variety of other server computers 14a–n, forming Web sites. Although only a limited number of server computers forming Web sites are illustrated, the number of Web sites accessible over the Internet is very large.

The user computer may comprise a personal computer (PC), an engineering workstation, a palm computer, a cellular phone, a large mainframe computer, or any other system capable of supporting Internet communication and display functions. Thus, the user computer may also be a low cost machine specially designed for Internet browsing. The user computer includes various application programs, including a Web browser. The Web browser retrieves information from Web servers for display on the user's computer display terminal. The Web browser obtains a copy of the requested material from the Web server when a user, via the user computer, requests information from a Web server. Web browsers generally use hypertext transfer protocol (HTTP) as a protocol for communicating over the Internet with Web servers. Standard TCP/IP is utilized as a protocol to communicate between the user computer and the Web sites, and generally according to the Simple Mail Transfer Protocol (SMTP), SMTP being a TCP/IP protocol that operates at layers 5–7 of the Open Systems Interconnection (OSI) model. Web browsers are widely commercially available, and include Internet Explorer, available from Microsoft Corporation and Navigator, available from Netscape, and others. Both Internet Explorer and Navigator are suitable web browsers for use in conjunction with the present invention, with Navigator Version 4.0 and Internet Explorer Version 4.0 being the preferred versions.

The game server 13 is a Web server providing administrative and other functions for the Internet-based search contest. In a preferred embodiment, the game server is a computer with an Intel Pentium 166 MHz microprocessor, computer memory storage devices comprising 64 megabytes of RAM and a 2 gigabyte SCSI II hard drive, and a PCI 100BaseT network interface card. The computer operates under the Red Hat Linux (version 4.2) operating system, and executes Apache Web Server software (version 1.2.5) available over the internet at http://www.apache.org. The game server provides for initiation, control, and termination of the Internet-based search contest.

Figure 2:
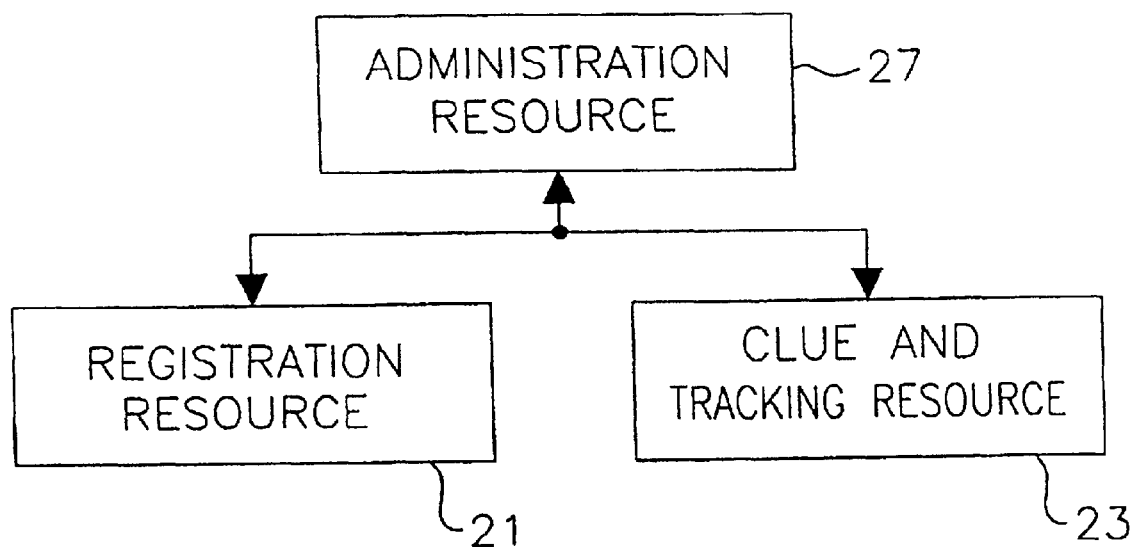
FIG. 2 is a block diagram of one embodiment of a server of the system of FIG. 1.

As shown in FIG. 2, the game server includes a registration resource 21 which allows users to inform the game server that they wish to be included in a particular game or quest. The game server also includes a clue and tracking resource 23 and an administration resource 27. The clue and tracking resource allows game participants to enter specific information relating to a particular target location. In one embodiment, the registration resource 21 downloads a "cookie" file to the user computer, such that personal contact information pertaining to the user remains persistent for a game-playing session and thus permits the user to navigate between the game site and the multitude of target locations without having to re-enter the user's personal or identification information. When the game participant enters appropriate information, the tracking resource updates the game participant's status and provides the game participant clues as to the next particular target location. The clues, or hints, pertain to particular target locations on the Web. The clues, in one embodiment, are not general knowledge questions, but are questions having answers that require information that can only be found by a user who visits and explores the particular target location. Generally, the clue and tracking resource provides clues to users such that any particular game participant only has clues pertaining to one particular target location at any given time. The administration resource allows a Web server administrator to update or modify various game details. In the preferred embodiment, the registration resource, the clue and tracking resource, and other functions of the server comprise program modules or scripts in the PERL (Version 5.0) programming language. PERL interpreters and the PERL programming language, and the uses thereof, are well known and often used by Web site developers.

The process of a user computer providing a URL to a server can be described as one of contacting a Web site and being provided a Web page. Some Web pages include forms which allow users to provide information to the Web server providing the form. This information is generally returned as part of a URL string, although other methods are also possible. The creation of forms and the reception of information from users by servers are well known methods to Web site developers.

Figure 3:
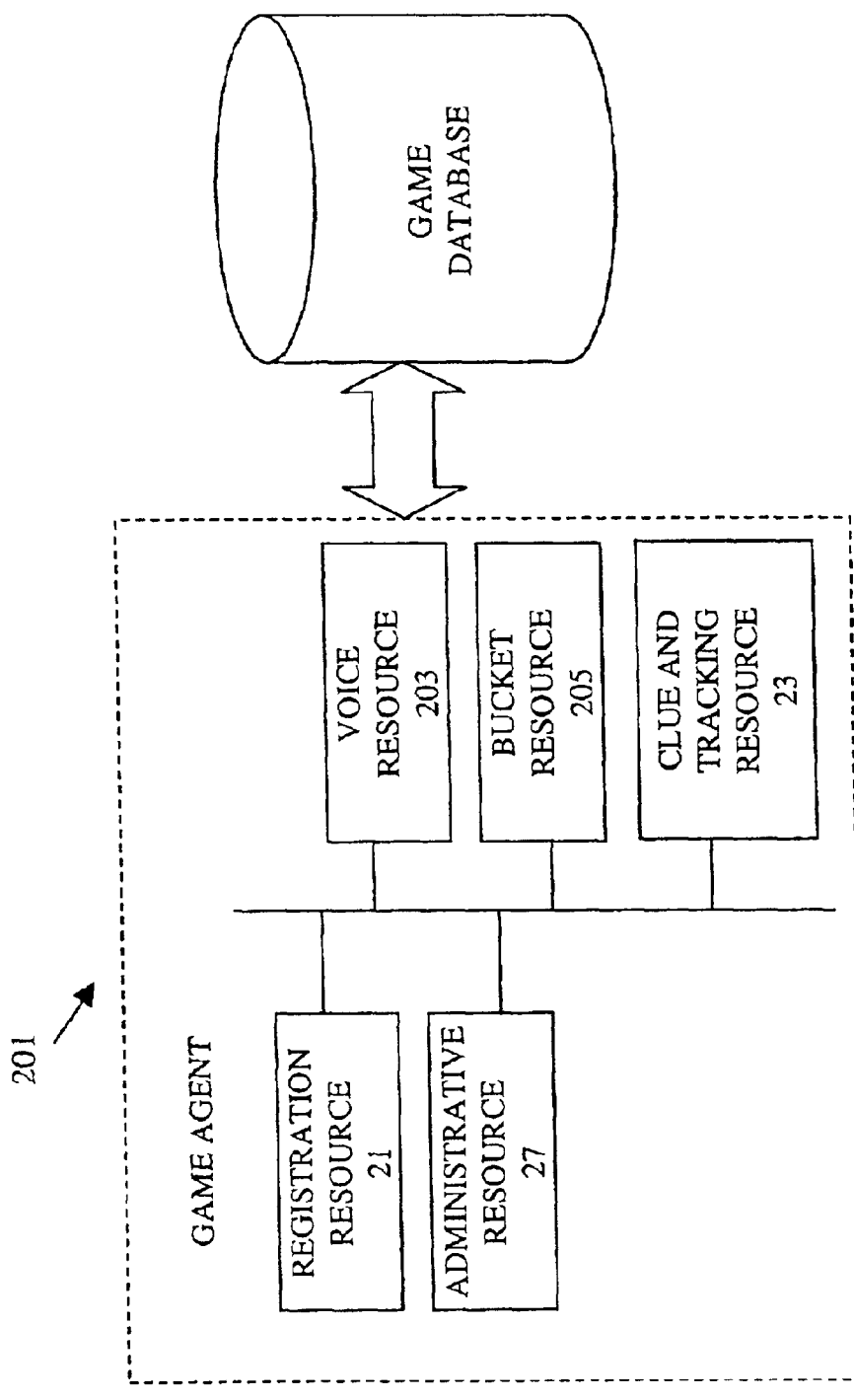
FIG. 3 is a block diagram of another embodiment of a server of the system of FIG. 1.

In one embodiment, as shown in FIG. 3, the game server includes a game agent 201. The game agent includes the registration resource 21, the clue and tracking resource 23 and the administration resource 27. The clue and tracking resource 23 further provides game information pertaining to a multiple of games. The games vary based on genre or theme, such as fields of interest like sports, music, cooking, retail markets with consumer items like computers, clothing, automobiles and other types common interests of game participants. In one embodiment, the games include challenge question games, quick one question games (question of the day), and other similar types of question and answer games. In one embodiment, the rules of the games are time-based, point-based, or a combination thereof. In a time-based game, the winner of the game is the game participant who completed the game in the least amount of time as compared to other game participants. In a point-based game, the winner of the game is the game participant who completed the game and accumulated the largest amount of points, as compared to other game participants. In a combination, time-based and point-based, game, in one embodiment, the winner of the game is the game participant who completed the game in the least amount of time and accumulated the greatest amount of points. The game information including registration information is stored in a game database.

The game agent is coupled to the game database. The game database, in one embodiment, is hosted in a mass storage device, such as a hard disk drive, a redundant array of independent disks (RAID) or a group of disks, also known as "just a bunch of disks" (JBOD) and is organized as an object or relational database. The game database contains information about identified users, such as demographic information and personal contact information, games, outcome status, answer keys, and other administrative information concerning the games provided by the game server. In one embodiment, the information stored in the game database is in the form of records. The records include game participant records, game records and prize records. The game participant records include, for example, a user profile including the user's e-mail address, home and/or business addresses and telephone numbers, and other types of contact or personal information concerning the user. The game records include, for example, different types of games available, In another embodiment, the game database is hosted on a game database server. The database server maintains and organizes the game database and provides connectivity between the game server and the user computer. The database server includes stored procedures, triggers and rules for data to quickly execute routine tasks, such as adding or removing a record from the game database. The database server supports multi-user access, allowing "n" number of users to access the game database, multi-threading and multi-tasking, providing fast and distributed access and operation, and locking mechanisms, preventing overwrites and other data conflicts.

In another embodiment, a redundant or backup game database server is provided. The redundant game database server includes mirror or copy of the game database to ensure that inadvertent data loss is minimized due to a failure in the game database server. At a predetermined time, e.g., a low utilization time for the game server, the game database is copied or transferred to the redundant game database server to provide updates to the redundant game database for items in the game database that has changed since a previous update of the redundant game database.

The game agent also includes a voice resource 203 and a bucket resource 205. The voice resource 203 provides character information regarding a personality associated with a particular game or games. The character information includes graphical images in the form static image formats, such as bitmaps, Joint Photographic Experts Group (jpeg), graphics interchange format (gif) and portable network graphics (png) graphic files, dynamic image formats containing meta-information about the images such dynamic image formats including virtual reality modeling language (VRML), sound files in the form of wave files, musical instrument digital interface (midi) files, and other various other types of multi-media information. The character information provides a collection of images and sounds to be presented to a user to guide a user in a selection and operation of the game.

In one embodiment, the character information is stored in the game database and includes pointers or logical links to an multi-media file that depicts a cartoon-like character with an associated voice reading the clue information to the user. The voice resource 203 maintains and administers the character information by retrieving the information as required by the currently selected game. For instance, upon the selection of a "more information" link at the game site for a specific game, the voice resource accesses the game database to retrieve the character information associated with the specific game.

In one embodiment, the bucket resource 205 includes a bucket interface and a bucket viewer. The bucket viewer is provided to the user computer by the game server. In one embodiment, the bucket viewer is downloaded to the user computer once the user has registered with the game server. In another embodiment, the bucket viewer is a standalone software application. The bucket viewer, in the described embodiment, is bundled with the game web browser as an applet, such as a Java applet, configured to access information pertaining to points and prizes associated and obtained by the user.

The bucket viewer graphically provides a user private data regarding any prizes obtained by the user and any accumulated points by the user. The bucket interface is included with the game agent and provides an interface between the bucket viewer and the game server. The bucket viewer requests information in the form of packets to obtain status of the user's prize and point information. The bucket interface receives the request and accesses the game database to retrieve the specified requested information for the specific user. As a response to the bucket viewer's request, the bucket interface transmits the retrieved record to the user computer where the bucket viewer processes the retrieved record to be presented to the user.

Figure 4:
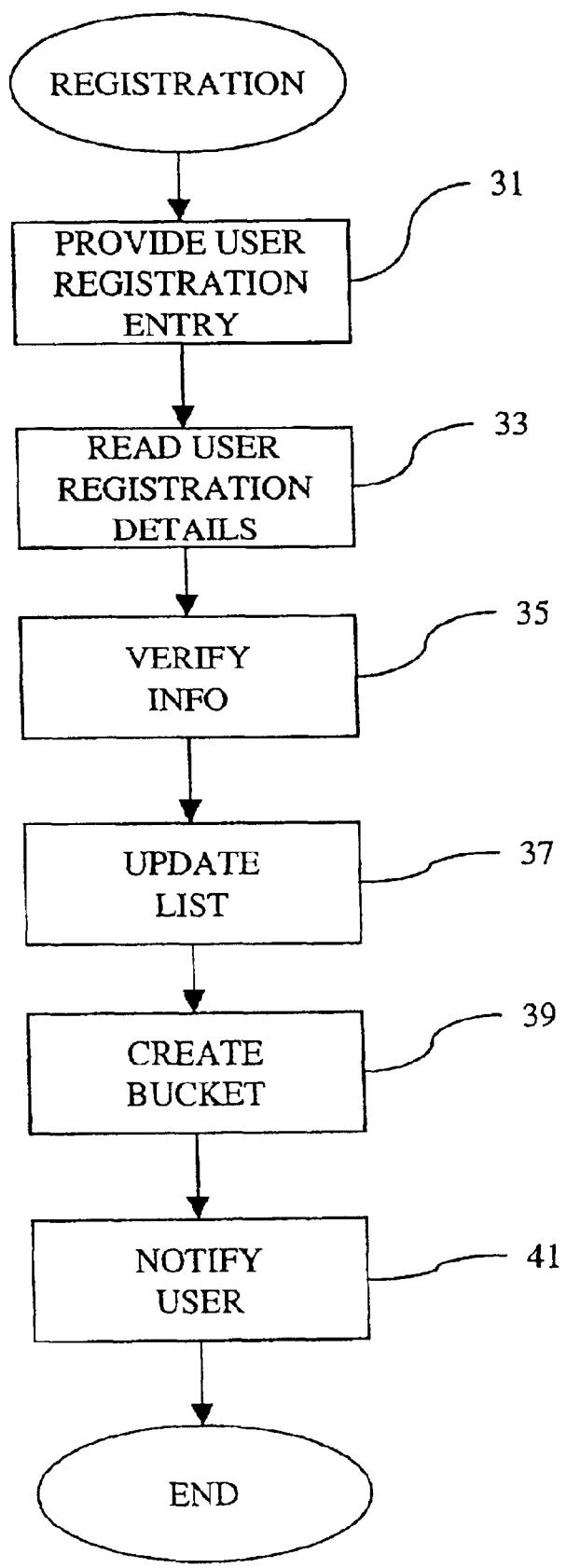
FIG. 4 is a flow diagram of the process of a user registration resource using the system of FIG. 1.

As shown in FIG. 4, when a user computer contacts the game site or a user registration site, the game server provides a page containing a user registration form in Step 31. The user registration form is illustrated in FIG. 5. The user registration form provides entry boxes for users to enter identification information. The entry boxes include a user First Name entry box 40a, a user Last Name entry box 40b, a user ID entry box 44, a user password entry box 46, a user E-mail address entry box 48, and a user phone number entry box 49. Users, using keyboards, computer mouses, and other computer input means, enter appropriate data in the user First and Last Name entry boxes and the user e-mail and phone number entry boxes. The user also enters a password in the password entry box for future user verification and identification purposes. The user ID is a number provided by the game server, and the user ID uniquely identifies each user. The user entry registration form also includes a sign up now button 42.

When the sign up now button is selected through use of the computer mouse or other computer input means, the Web browser software executing on the user's computer transmits the information entered in the entry boxes to the game server. The game server reads the information on the user registration form in step 33. In step 35 the game server verifies that all entry boxes of the user registration form have entries. In step 37 the game server updates a game participant list with the information provided by the user. The game server stores the game participant list in the game database.

In one embodiment, the game server populates or modifies a game record with links or stored information regarding the game participant. The game server also stores the information provided by the user in the game database as a game participant record. In another embodiment, the game participant list and game participant information are stored in the game server computer memory.

In step 39, the game server through the bucket interface creates a bucket record specifically for the game participant. The bucket record is associated with or linked to the game record and the user record and includes information on points and prizes obtained by the game participant. In step 41 the game server attempts to transmit an e-mail to the user to verify that the e-mail address provided by the user exists and to notify the user that the user has been successfully registered. Alternatively or additionally, the user is prompted by the game site to provide a unique user identification. In one embodiment, the game participant first enters through a "membership only" gate or link prior to being prompted to provide a unique user identification. The unique user identification includes a password and/or an unique number or username randomly compiled by the game server based on the information provided by the game participant previously on a prior visit of the game participant to the game site. By providing the unique user identification, the game participant can bypass process illustrated in step 3.

Figure 6:
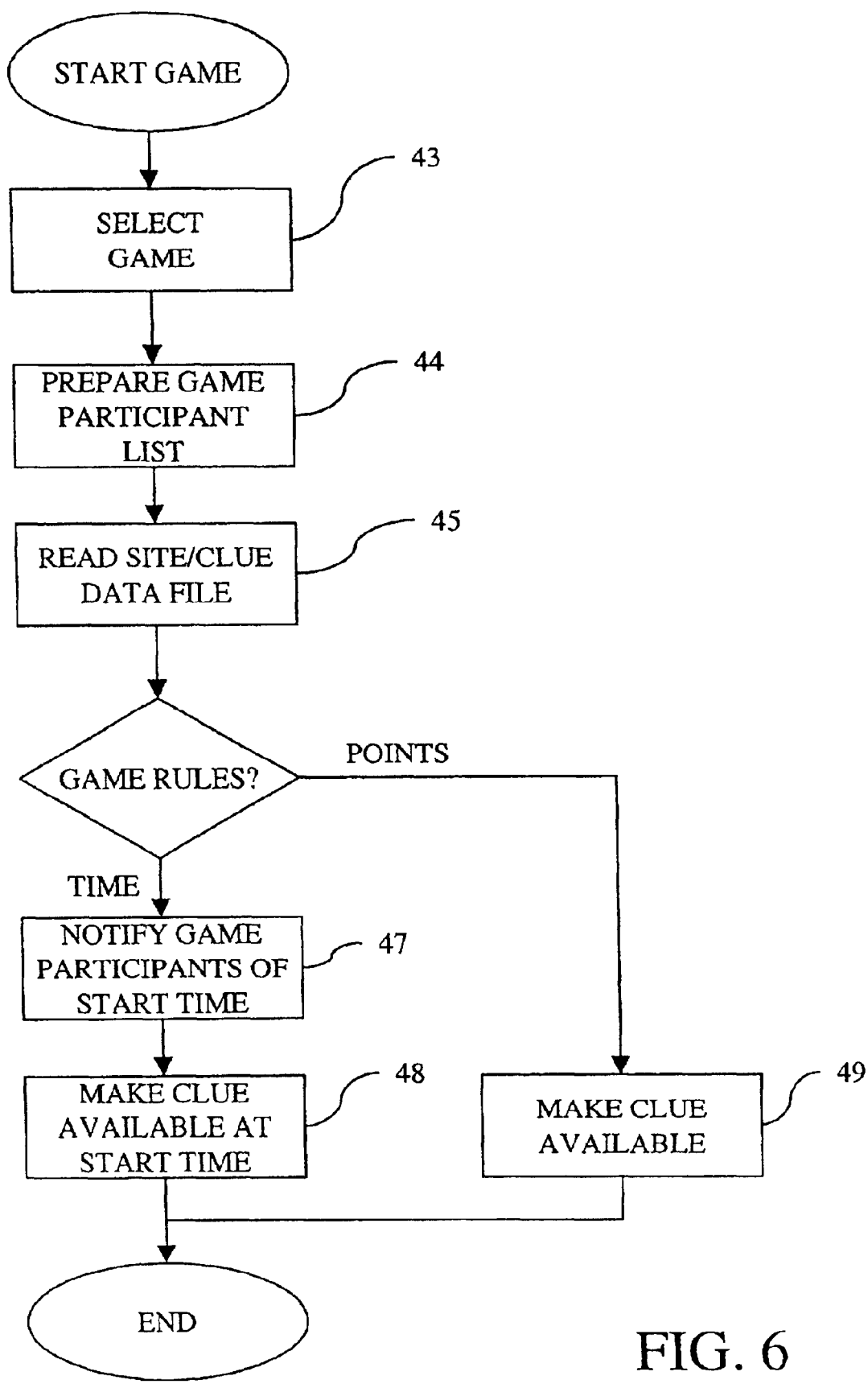
FIG. 6 is a flow diagram of the process of a start game using the system of FIG. 1.

A flow diagram of a start game process is illustrated in FIG. 6. The game server prompts the game participant to select a game in step 43. In one embodiment, the game agent provides the user a predetermined selection of games grouped by a selection of topics or categories. The clue and tracking resource based on the selection of the game in step 43 triggers the voice module to activate a virtual character to guide the user through the game process. The virtual character through audio and animation sequences describes the rules of the game selected. Optionally, a bypass or inhibit button is provided to the user to prevent or cancel the activation of the virtual character. The game server prepares a list of game participants for a particular game in Step 44. Optionally, game participants are registered users who have requested entry into a particular game. Otherwise, the list of game participants is the game participant list previously stored in the game database or the game server computer memory.

The game server also retrieves and reads the game records from the game database containing a game data file or links to a game data file having information relating to the target locations for the game. The game data file includes information identifying the target locations and clue data, including a start point internet location, pertaining to those locations in Step 45. A sample data file is illustrated in Table 1.

TABLE 1

| Target Location | Clue | Start Point |
|---|---|---|
| http://a.com/ sample1 | I'm a book written by a best selling author who has been known to play Hide and Seek with Jack and Jill and loves to watch movies and Kiss the Girls. But to know my title you'll have to remember what type of mammals Tom and Jerry were. | http://a.com |
| http://b.com/ sample2 | I am a world renowned gammer who has been bested by no ONE. But a machine gave me the blues. My | http://b.com |

TABLE 1-continued

| Target Location | Clue | Start Point |
|---|---|---|
| | idols are Petrosian, Capablanca, and Tal. Technology sparred my predecessors Fisher and Spassky, from knowing the depths of the blues. | |
| http://c.com/sample3 | To find my weight you'll need to look for the two most common things that a business sells. One you can touch, one you can't. Then continue to search with no strings attached. If you get this far, you'll find my three initials. You're almost there, but next you'll have to ask the question to your left. From here don't stop 'til you reach the end and you'll know my weight. | http://c.com |
| http://x.com/sample | I'm an estimation of how long your journey takes. But first you'll need charging ability times two. Leave your tickets at the door because you won't need them for this trip. With those two clicks your travels are finished. The answer is staring you in the face. | http://d.com |

The game record also includes information on the rules of the game, i.e., time-based, point-based, or a combination thereof. In step 46, the game server determines the rules of the game selected. If the game selected is point-based, the game server makes the first clue for the first target location available to the game participant in Step 49.

If the game selected is time-based or a combination, the game server notifies each game participant of the starting time of the game by sending the game participant an e-mail in Step 47. The e-mail notifies the game participants of both the game start time and how the game participant may obtain the first clue for the first target location on or after the start time. At the game start time the game server makes the first clue for the first target location available to all game participants in Step 48.

Figure 7:
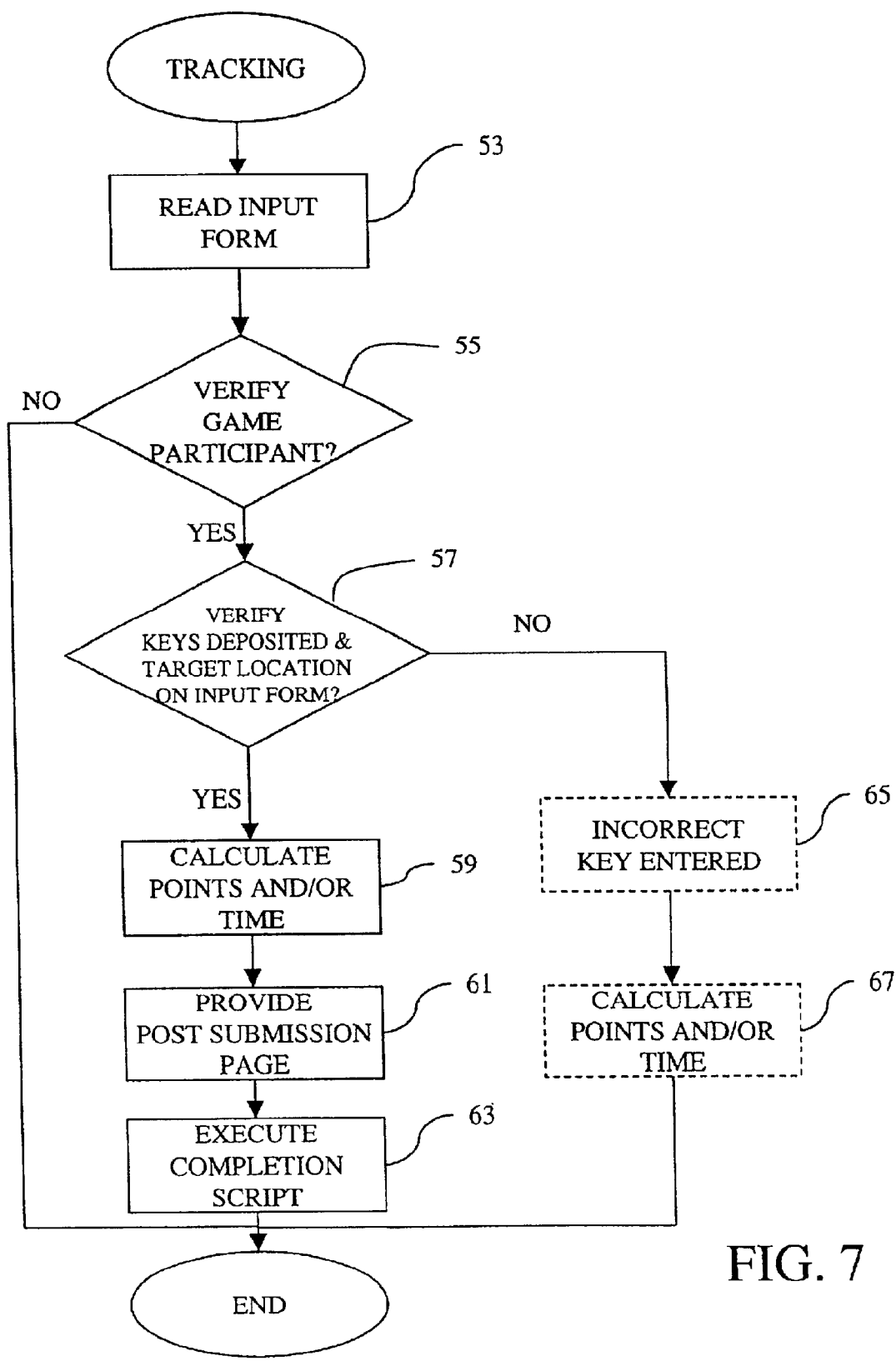
FIG. 7 is a flow diagram of the process of a clue and tracking resource using the system of FIG. 1.

A process of the game clue and tracking resource is illustrated in FIG. 7. The game clue and tracking resource reads a submission form in which the game participant has entered a user name, a password, and a key, which may also be called a code word, in step 53. Alternatively, the game clue and tracking resource obtains the user name and password from a "cookie" file on the user computer. The input form is provided to the game participant by the Web server of the target location. Preferably, the target location Web page includes a link to a Web page, maintained by the target location Web server, which includes the submission form. Although the target location Web server provides the submission form, the ACTION field of the submission form contains the internet address of the game server, thereby instructing the browser software operating on the game participant's computer to transmit the completed form to the game server.

In Step 55 the tracking process verifies that the user name and password entered on the submission form or in the "cookie" file match that of a game participant by comparing the entered user name and password with those of the registered users. If the user name and password entered on the submission form do not match a user name and password on the list of game participants, the tracking process exits. If the input user name and password match that of a game participant, the tracking process determines if the game participant has entered the correct key or code word on the input form in Step 57. If the game participant did not enter the correct key or code word, the tracking resource exits. Alternatively, the tracking resource transmits a page or information to the user computer to display a message that the key word entered was incorrect in step 65.

In one embodiment, for a points-based game, points are subtracted from the game participant for entering the incorrect key word in step 67. In one embodiment, the tracking resource includes a participant point counter associated with the game participant and stored in the game server computer memory, the user computer memory or the game database. The tracking resource adds or subtracts points from the participant point counter based on the correct and/or incorrect key words entered by the game participant. In other words, the tracking resource scores an answer or response provided by the game participant. In one embodiment, the tracking resource time stamps the indication that the game participant has entered a key word and/or has found the target location. The time stamp is also stored in conjunction or associated with the participant point counter.

In one embodiment, for a combination game points are subtracted from the game participant for entering the incorrect key word and based on the amount of time the game participant utilized to enter the incorrect key word in step 67. In one embodiment, the amount of time is compared to a series of threshold timers in increasing increments, such as ten seconds, thirty seconds, sixty seconds and so on, to determine the point subtracted or penalized against the game participant. For example, the game participant who enters the incorrect key word in forty seconds is penalized forty points, but the game participant who enters the incorrect key word in ten seconds is penalized twenty points. In this example, the game participant is encouraged to learn and master navigating and searching a target location quickly. In another example, the game participant who enters the incorrect key word in forty seconds is penalized twenty points, but the game participant who enters the incorrect key word in ten seconds is penalized forty points. In this example, a game participant is not only encouraged to learn and master navigating and searching a target location quickly but also to carefully and throughly examine the target location for information and to discourage uneducated guessing.

If the correct key or code word was entered, the tracking resource provides the game participant a post submission page in step 61. The post submission page contains a clue pertaining to the next target location and a start point. The clue is descriptive text, graphical material, or audio information pertaining to the Web site that comprises the target location. In step 63, the game server executes a form completion script. The form completion script causes the game server to store in the game server computer memory an indication that the game participant successfully found the target location. The form completion script also time stamps the indication that the game participant found the target location, and the time stamp is also stored in the computer memory of the game server.

In one embodiment, for a points based game points are awarded to or accumulated by the game participant for entering the correct key word in step 69. In another embodiment, for a combination game points are awarded to the game participant for entering the correct key word and based on the amount of time the game participant utilized to enter the incorrect key word in step 69. In one embodiment, the amount of time is compared to a series of threshold timers in increasing increments to determine the point awarded to the game participant.

The total amount of points subtracted or added can vary and thus provide the flexibility of increasing or decreasing the difficulty of a particular game. Also, the total number of points subtracted, added and other previously mentioned types of rule information, are pre-determined and stored in the game database within the game records. The tracking resource is configured to obtain the rules information, once the game is selected by the game participant.

Game termination occurs after a preset time from the game start time. In one embodiment, game termination occurs after a predetermined threshold of points is accumulated by a game participant. For a time-based game, the winner of the game is the game participant who has located the most target locations in the least amount of game time. For a points-based game, the winner of the game is the game participant who completed the game and accumulated the largest amount of points, as compared to other game participants. For a combination game, time-based and point-based, the winner of the game is the game participant who completed the game in the least amount of time and accumulated the greatest amount of points.

Figure 8:
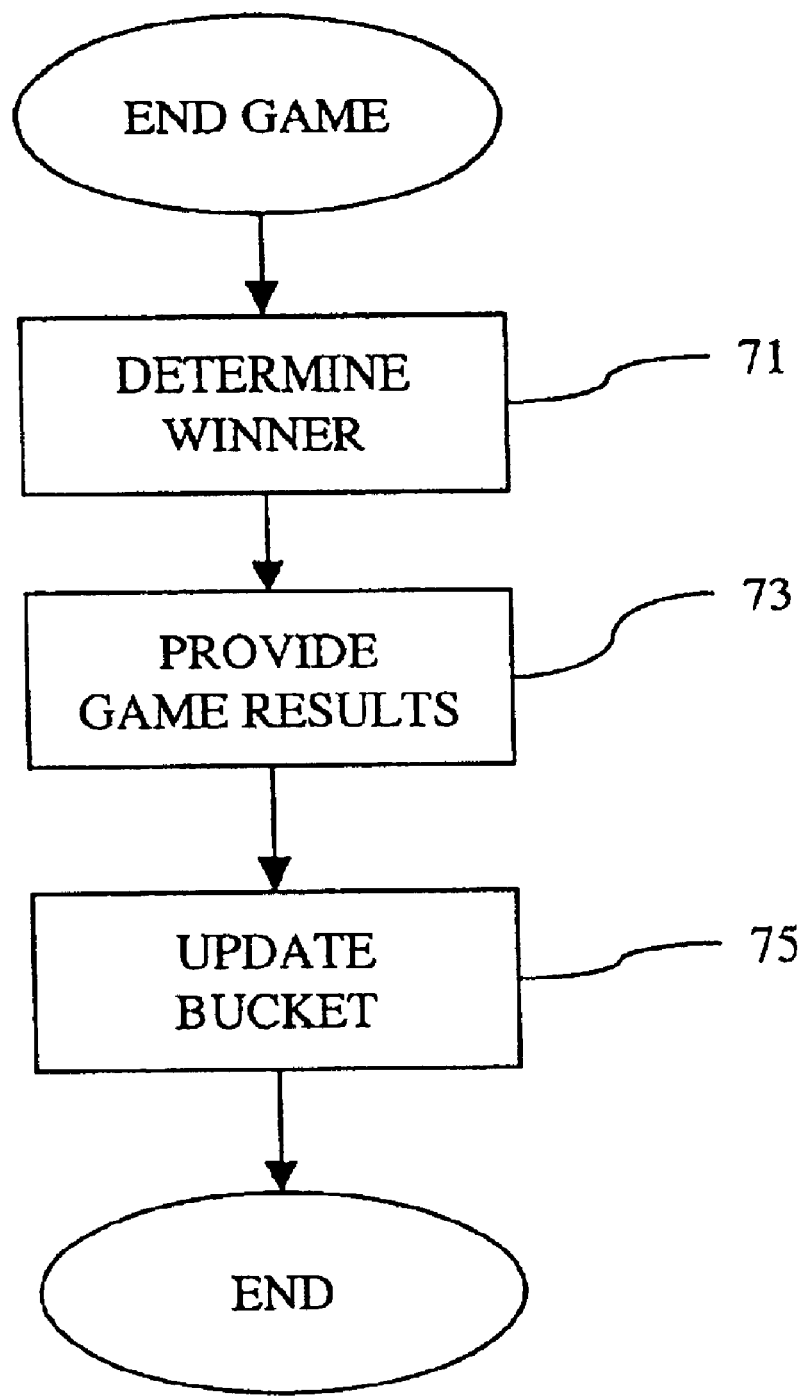
FIG. 8 is a flow diagram of the process of an end game using the system of FIG. 1.

A flow diagram of an end game process is illustrated in FIG. 8. The game server determines the winner of the selected game in step 71. The game server sends a page or information to the game participants on the game participants list to inform or notify each game participant the results of the game in step 73. In one embodiment, the game server provides the winner of the game, prize information and the total number of points accumulated by winning the game. In one embodiment, the total number of points accumulated by winning the game corresponds to the total number of points awarded in the process of playing the game, as previously described. In another embodiment, the total number of points accumulated by winning the game corresponds to a predetermined number of points associated with each game based on a particular criteria, such as the overall difficulty in the game, length of the game, number of target locations involved in the game, total number of game participants, and other similar types of game information, or randomly. For example, if the game includes fifty game participants with a game time of two days and 20 target locations a point total for winning the game could be 5,000 points. Conversely, if the game includes ten game participants with a game time of one hour and five target locations a point total for winning the game could be a hundred points. In one embodiment, the game server also provides the game participants that did not win the game results of the game and constellation prize information and/or a token number of points.

In step 75, the game server stores the total number of points accumulated, token number of points and/or prizes awarded in the game database with the respective user records of each the game participants through the bucket interface and then the process ends. Accordingly, a game participant through the bucket viewer is able to view the total number of points received and any prizes awarded. In one embodiment, the total number of points received are added or combined with points accumulated by the game participant from previous games. In one embodiment, points received are redeemable to receive prizes, such as consumer items, electronic coupons for discounts, electronic credit or cash, and so on.

In an alternate embodiment, the user plays the game with the user's computer also simulating the game server. In this embodiment, the user is the sole game participant. The game data files, including target sites and the clues relating to the target sites, are stored on the user computer's memory, and this can be accomplished via the download of data from the Internet or through the use of removable storage media such as floppy disks. Versions of the tracking process and the clue provision process are similarly provided to the user computer's memory, and are executable by the user's computer. The clue and tracking process is modified to eliminate verification of a game participant as such verification is unnecessary when the game is limited to a single user's computer. In such an embodiment the user may leisurely use the game to improve the user's Web searching skills and to view a variety of Web sites without the pressure of competition.

In another embodiment, the block diagram of the present invention shown in FIG. 1 is utilized in the context of local area network (LAN) or an intranet. In a LAN or intranet, the user computer 11 is linked, telephonically or via other communication methods, to one or more other computers on the LAN. One of these other computers is the game server 13. The game server provides initiation, control, and termination of the Internet-based search contest.

The user computer includes a game web browser. The game web browser is similar to Web browsers that are widely commercially available. However, the game web browser, in this embodiment, fetches or retrieves web pages and other information only from the game server 13. The game web browser retrieves information from game server 13 for display on the user's computer display terminal. Therefore, when the game web browser requests information from the game server, the game web browser obtains a copy of the requested material from the game server. The game database, including target sites and the clues relating to the target sites, are stored with the game server, and this can be accomplished via the download of data from the Internet or through the use of removable storage media such as floppy disks. Versions of the tracking process and the clue provision process are similarly provided to the game server, and are executable by the game server. In such an embodiment multiple users may leisurely use the game to improve the user's Web searching skills and to view a variety of Web sites. Furthermore, different types of games and different target sites can be added through the game server for specialized or private games limited to the LAN or intranet users. Also, internet issues, such as delays in dial-ups or web congestion can be avoided.

Thus, the Internet-based search contest of the present invention provides a system and method of improving, tracking and monitoring Web searching skills. Additionally, the present invention provides a method and system of inducing users to visit and view a variety of Web sites. Although this invention has been described in certain specific embodiments, many additional modifications and variations would be apparent to those skilled in the art. It is therefore to be understood that this invention may be practiced otherwise than is specifically described. Thus, the present embodiments of the invention should be considered in all respects as illustrative and not restricted, the scope of the invention to be indicated by the appended claims rather than the foregoing description.

What is claimed is:

1. A method of tracking a user of an Internet-based search and tracking game executing on a user computer, the user navigating between a game site on first server and a plurality of target sites on other servers, comprising:

provide clue information by the first server regarding at least one of the plurality of target sites to the user computer at a start time;

connecting the user computer to the at least one of the plurality of target sites, the at least one of the plurality of target sites including a plurality of target locations;

receiving answer information responsive to the clue information;

recording an answer time upon receipt of the answer information;

comparing the answer information to a predetermined answer key;

subtracting points associated with the user if the answer information does not match the predetermined answer key and increasing points associated with the user if the answer information matches the predetermined answer key; and wherein the points subtracted if the answer information does not match the predetermined answer key is based on a difference between the answer time and the start time.

2. The method of tracking a user of an Internet-based search and tracking game executing on a user computer, the user navigating between a game site on a first server and a plurality of target sites on other servers, of claim 1 wherein connecting the user computer to the at least one of the plurality of target sites, the at least one of the plurality of target sites including a plurality of target locations, comprises providing the user computer a link to the at least one of the plurality of target sites.

3. The method of tracking a user of an Internet-based search and tracking game executing on a user computer, the user navigating between a game site on a first server and a plurality of target sites on other servers, of claim 2 wherein the link is a URL of the at least one of the plurality of target sites.

4. The method of tracking a user of an Internet-based search and tracking game executing on a user computer, the user navigating between a game site on a first server and a plurality of target sites on other servers, of claim 3 further comprising:

identifying the user at the game site; and providing the user computer unique user identification information.

5. The method of tracking a user of an Internet-based search and tracking game executing on a user computer, the user navigating between a game site on a first server and a plurality of target sites on other servers, of claim 4 wherein the predetermined answer key includes a plurality of answers, each answer of the plurality of answers including specific information associated with and available at the at least one of the plurality of target locations of the at least one of the plurality of target sites.

6. The method of tracking a user of an Internet-based search and tracking game executing on a user computer, the user navigating between a game site on a first server and a plurality of target sites on other servers, of claim 5 further comprising:

selecting at least one of a plurality of games; and generating a unique voice module associated with the at least one of the plurality of games selected, the unique voice module providing game information to guide the user to the at least one of the plurality of target sites.

7. The method of tracking a user of an Internet-based search and tracking game executing on a user computer, the user navigating between a game site on a first server and a plurality of target sites on other servers, of claim 6 wherein the generation of the unique voice module and the clue information is based on the at least one of the plurality of games selected.

8. The method of tracking a user of an Internet-based search and tracking game executing on a user computer, the user navigating between a game site on a first server and a plurality of target sites on other servers, of claim 7 wherein the connection of the at least one of the plurality of target sites is based on the game selected.

9. The method of tracking a user of an Internet-based search and tracking game executing on a user computer, the user navigating between a game site on a first server and a plurality of target sites on other servers, of claim 8 further comprising:

aggregating the points associated for each answer information that successfully corresponds to the predetermined answer key; and storing the points aggregated at the game site.

10. The method of tracking a user of an Internet-based search and tracking game executing on a user computer, the user navigating between a game site on a first server and a plurality of target sites on other servers, of claim 9 wherein storing the points aggregated includes establishing individual buckets for each identified user and associating the points aggregated to the individual buckets established and a plurality of prizes.

11. The method of tracking a user of an Internet-based search and tracking game executing on a user computer, the user navigating between a game site on a first server and a plurality of target sites on other servers, of claim 10 further comprising:

identifying a plurality of users at the game site; and generating unique user identification information corresponding to each of the plurality of users identified.

12. The method of tracking a user of an Internet-based search and tracking game executing on a user computer, the user navigating between a game site on a first server and a plurality of target sites on other servers, of claim 11 further comprising notifying each of the identified user regarding status of the game selected.

13. The method of tracking a user of an Internet-based search and tracking game executing on a user computer, the user navigating between a game site on a first server and a plurality of target sites on other servers, of claim 12 further comprising:

generating additional clue information, the additional clue information pertaining to an additional one of the plurality of target sites;

initiating additional start time in response to generation of additional clue information;

connecting the user computer to the additional one of the plurality of target sites;

receiving answer information after connection of the user to the additional one of the plurality of target sites;

comparing answer information to a predetermined answer key;

recording an end time upon the comparison of the answer information to the predetermined answer key being successful; and associating points to a difference between the end time and start time.

14. The method of claim 1 wherein the number of points subtracted decreases with an increase in difference between the answer time and the start time.

15. A method of tracking a user of a search contest, the user navigating between a game site and a plurality of target sites, comprising:

providing clue information regarding at least one of the plurality of target sites to the user;

connecting the user to the at least one of the plurality of target sites, the at least one of the plurality of target sites including a plurality of target locations;

receiving answer information responsive to the clue information;

comparing the answer information to a predetermined answer key;

granting points based upon a match between the answer information and the predetermined answer key;

deducting points based upon a difference between the answer information and the predetermined answer key; and measuring a time period delimited by when the clue information is provided and when the answer information is compared, such that the points granted or deducted is further based on the time period measured.

* * * * *